United States Patent [19]

Lutz

[11] 3,970,204

[45] July 20, 1976

[54] SKEWED ROLLER CONVEYOR

[75] Inventor: Karl Treasure Lutz, Gardner, Ill.

[73] Assignee: Caterpillar Tractor Co., Peoria, Ill.

[22] Filed: Jan. 27, 1975

[21] Appl. No.: 544,160

[52] U.S. Cl. .......................... 214/339; 51/103 TF; 51/215 SF; 198/127 R
[51] Int. Cl.² ........................................ B65H 51/26
[58] Field of Search .................... 198/127; 214/339; 51/79, 103 TF, 139, 215 SF

[56] References Cited

UNITED STATES PATENTS

| | | | |
|---|---|---|---|
| 2,626,717 | 1/1953 | Kraner | 214/339 |
| 2,775,077 | 12/1956 | Whittenberg | 214/339 |
| 2,855,729 | 10/1958 | Render | 51/103 TF |
| 3,091,900 | 6/1963 | Whittenberg | 214/339 X |
| 3,322,291 | 5/1967 | Smith | 214/339 |
| 3,434,610 | 3/1969 | Wilson | 51/79 X |
| 3,503,156 | 3/1970 | Schaller | 51/215 H |
| 3,571,981 | 3/1971 | Schaller et al. | 51/139 X |
| 3,664,531 | 5/1972 | Magnusson et al. | 214/339 |
| 3,713,555 | 1/1973 | Wloszek | 214/339 |
| 3,718,247 | 2/1973 | Dreher | 198/127 |

*Primary Examiner*—John J. Love
*Assistant Examiner*—Richard K. Thomson
*Attorney, Agent, or Firm*—Phillips, Moore, Weissenberger Lempio & Strabala

[57] ABSTRACT

The invention is concerned with an improved skewed roller conveyor for transporting cylindrical work pieces along a longitudinal axis thereof at a controlled speed. A plurality of cylindrically surfaced driving rollers which are driven by a single shaft are provided, the driving rollers having their axes of rotation skewed at an angle, A, from the surface of a way member which supports them. A plurality of cylindrically surfaced support rollers in one to one relation with the driving rollers are supported to rotate about an axis skewed at an angle, −A, from a second way member above which said support rollers are located.

13 Claims, 5 Drawing Figures

SKEWED ROLLER CONVEYOR

BACKGROUND OF THE INVENTION

1. Field of the Invention

The invention is concerned with a conveyor for transporting cylindrical work pieces along a longitudinal axis thereof at a controlled rate of speed. Such conveyors are useful in a number of applications including, for example, centerless grinders.

2. Prior Art

A number of conveyor systems are known for feeding cylindrical work pieces into grinders, polishing machines, induction heaters and other apparatus requiring throughfeed of the work pieces at a controlled rate. Some of the prior art conveyor systems make use of rollers which are canted or skewed at an angle from their frames whereby a resulting helical feed of the work pieces is attained. Patents which disclose some of the prior art devices for advancing or feeding cylindrical work pieces are U.S. Pat. Nos. 1,082,451; 1,256,276; 1,319,000; 1,801,048; 1,835,668; 3,474,914 and 3,503,156.

A problem common to prior art conveyor systems for feeding cylindrical work pieces along a predetermined longitudinal axis thereof is the complex drive mechanism required to synchronize operation of the powered rollers of the prior art devices. The conveyor of the present invention provides a simple, economical coupling arrangement permitting the powered rollers to be obliquely mounted directly onto and driven by a single rigid powered shaft.

SUMMARY OF THE INVENTION

The invention comprises a conveyor for transporting cylindrical work pieces along a longitudinal axis thereof at a controlled speed. The conveyor of the present invention comprises a longitudinally extending frame with a pair of longitudinal way members mounted above the frame with the longitudinal axes thereof in generally parallel relation to one another and to the longitudinal axis of the frame. The shaft is located generally above and with its axis generally parallel to the longitudinal axis of one of the way members. A plurality of cylindrically surfaced driving rollers driven by the shaft are each restrained by a restraining means intermediate each of said driving rollers and said one of way members to rotate about an axis of rotation at an angle, A, from the axis of the shaft in a direction away from the one of said way members. A plurality of cylindrical surfaced support rollers in one to one relation with and spaced apart from the driving rollers are rotatingly supported generally above the other of said way members. Means are provided intermediate each of the support rollers and the other of said way members for restraining each of said support rollers to rotate about an axis of rotation at an angle, A, from a line intersecting the axes of each of said support rollers and parallel to the axis of said shaft in a direction toward said other of said way members. A motor is drivingly coupled to the shaft.

BRIEF DESCRIPTION OF THE DRAWINGS

The invention will be better understood by reference to the drawings which illustrate a preferred embodiment of the invention, wherein like numbers denote like parts throughout and in which.

DETAILED DESCRIPTION OF THE PREFERRED EMBODIMENT

Figure 1:
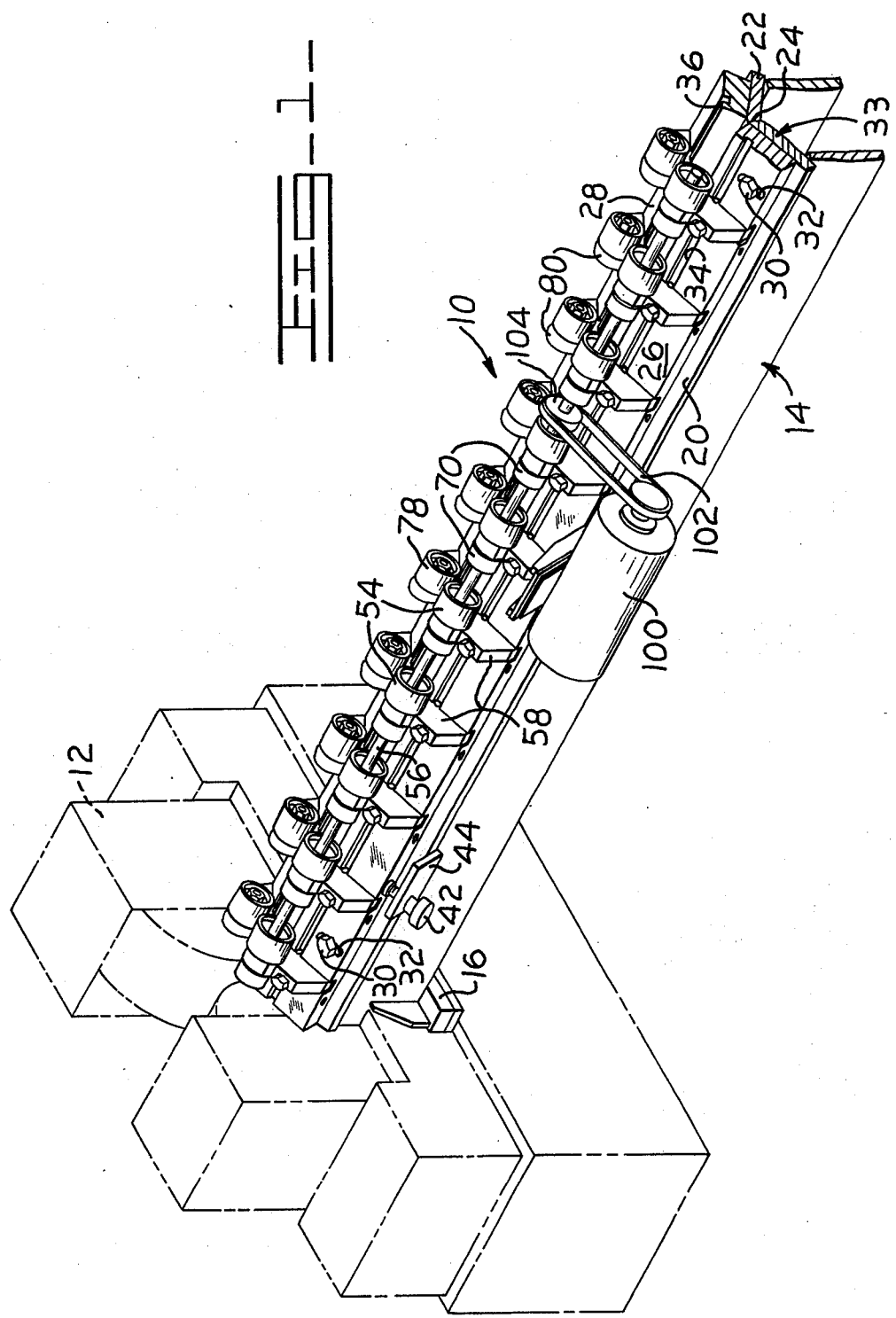
FIG. 1 illustrates in partial perspective view a conveyor system embodying the principles of the present invention.
Figure 2:
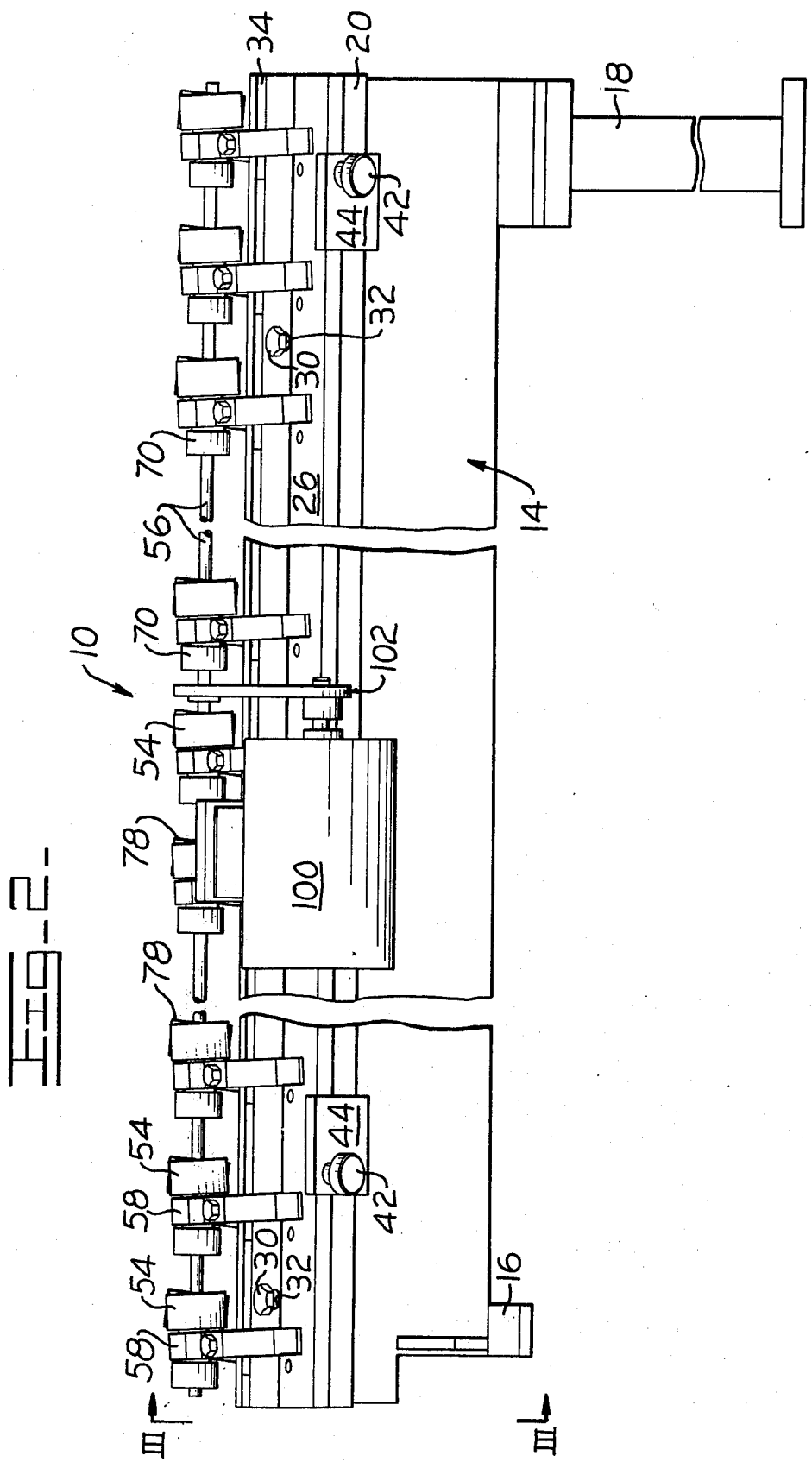
FIG. 2 illustrates in partial side elevation view a conveyor system embodying the principles of the present invention.

With reference primarily to FIGS. 1 and 2 of the drawings, a conveyor system embodying the principles of the present invention is generally indicated by the reference numeral 10. By way of illustrating a representative application of the invention, the conveyor system 10 is arranged to feed work pieces as in FIG. 1 into a centerless grinder 12, shown in phantom. A similar conveyor system, not illustrated but preferably embodying the features of the illustrated system 10, is positioned on the opposite side of the grinder 10 to convey work pieces away upon completion of the grinding operation.

The conveyor system 10 includes a frame 14 alignably attached at one end to, for example, grinder 12, by a locating cradle 16 and supported at its opposite end, as shown in FIG. 2, by a floor mounted pedestal 18. The upper portion of the frame in the preferred embodiment illustrated, comprises a pair of inclined bed plates 20 and 22 joined at their edges to form an elongated inverted V with a longitudinally disposed axis 24 at their plane of joining. A pair of way members 26 and 28 are respectively adjustably mounted on the bed plates above the frame with their longitudinal axes generally parallel to one another and to the longitudinal axis of the frame by bolts 30 extending through transverse slots 32 provided in the way members 26 and 28 and threaded into the bed plates 20 and 22 respectively. The bed plates 20 and 22, as will be apparent, form two generally equal sized legs which are joined at the apex 24 to form the inverted V shape of the top 33 of the frame 14. The way members 26 and 28 each have a longitudinally disposed alignment channel 34 and 36 respectively formed along the length thereof and a plurality of transverse channels 38 disposed at right angles to the alignment channels 34 and 36. The purposes of the longitudinally disposed alignment channels 34 and 36 and of the transverse channel 38 are explained below.

Figure 3:
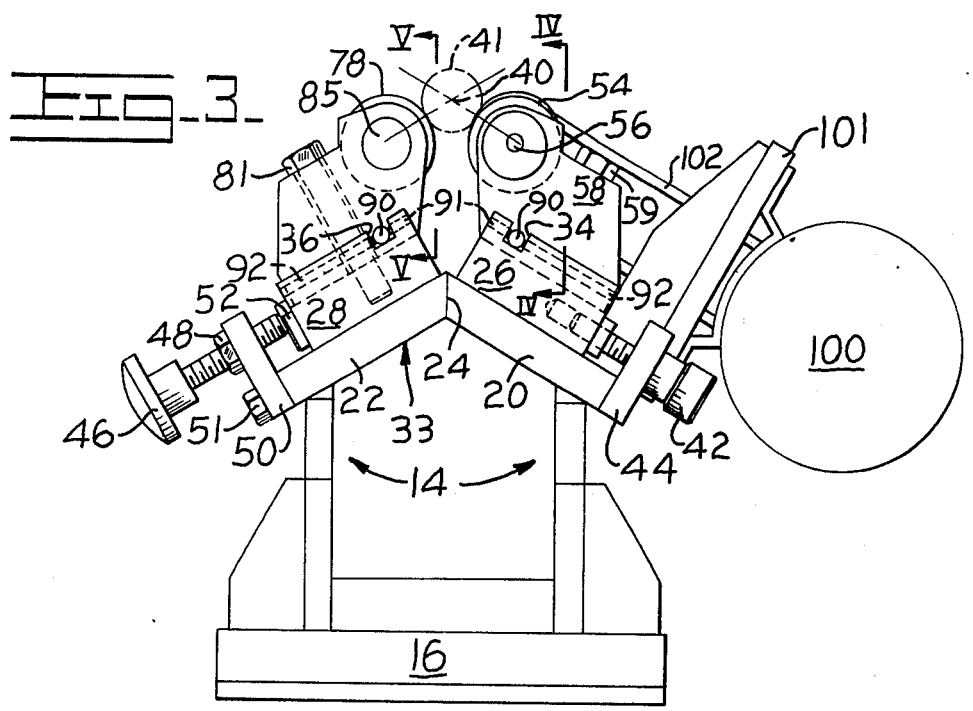
FIG. 3 is a view taken from the plane III — III of FIG. 2.

As is best shown in FIGS. 1 and 3, lateral or transverse adjustment of way member 26 with respect to an imaginary longitudinal axis 40 of a cylindrical work piece 41 shown in phantom in FIG. 3 and positioned above and substantially parallel to the axis 24 of the inverted V formed by the pair of inclined bed plates 20 and 22 is provided by a pair of adjustment screws 42 each rotatably mounted in a mounting block 44 secured to the bed plate 20 and threadably engaging the way member 26. One of the pair of adjustment screws 42, as illustrated in FIG. 2, is located adjacent each of the ends of the way member 26. Lateral adjustment of way member 28 is provided by another pair of adjustment screws 46, one of which is shown in FIG. 3, threaded through a nut 48 fixed to mounting block 50 which is secured to bed plate 22 by bolt 51 so that the screws react against a bearing plate 52 attached to the way member 28. One adjustment screw 46 is provided adjacent each end of the way member 28.

Figure 4:
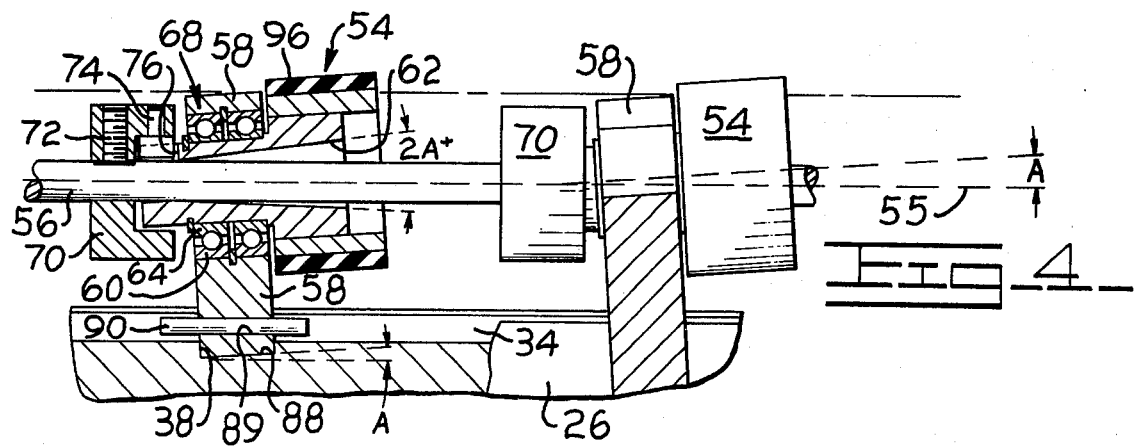
FIG. 4 is a view taken from the plane IV — IV of FIG. 3.

As shown most clearly in FIG. 4, a plurality of means are provided intermediate each of a plurality of driving rollers 54 for restraining each of said driving rollers to rotate about an axis of rotation at an angle, A, from the axis 55 of a shaft 56, said angle, A, being a direction away from said one of said way members 26. In the embodiment illustrated, the restraining means comprises a plurality of bearing support fixtures 58 mounted via a plurality of bolts 59 in the transverse channels 38 provided in way member 26. In the preferred embodiment illustrated in the drawings, a first plurality of outer races 60 are included one atop each of said fixtures 58, said outer races 60 being supported at an angle, A, from the axis 55 of the shaft 56. Each of the rollers 54 has a tapered conical bore 62 and is mounted to the inner race 64 of a ball bearing 68. The generally conical bore 62 through which the shaft 56 passes has an angle thereof of slightly greater than 2 A. This is necessary to ensure free rotation of the roller 54 about the shaft 56. The drive shaft 56 extends through the tapered bore of each of the rollers 54 and rotatably drives each roller through a coupling 70 secured to the shaft 56 by a set screw 72. The coupling 70 includes a pin 74 slidably engaging a slot 76 formed in the roller 54.

Figure 5:
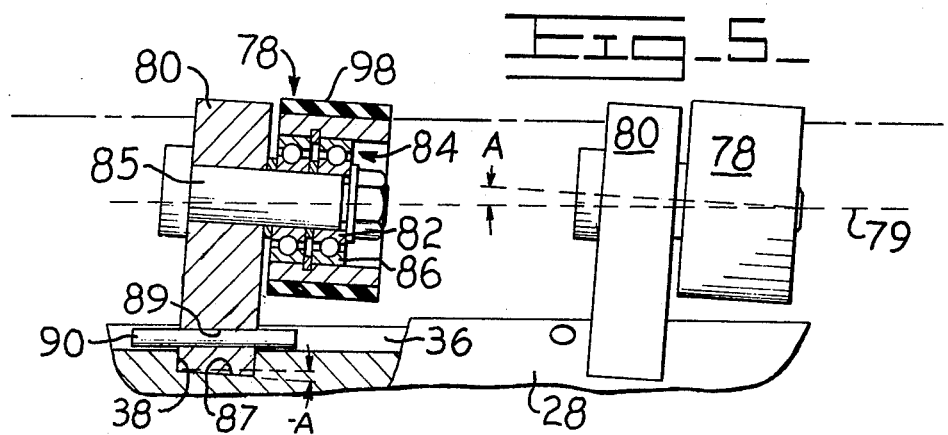
FIG. 5 is a view taken from the plane V — V of FIG. 3.

With reference to FIGS. 3 and 5, a plurality of support rollers 78 are each restrained by means intermediate each of said support rollers 78 and the way member 28 to rotate about an axis of rotation at an angle, A, from a line 79 intersecting the axes of each of said support rollers 78 and parallel to the axis of said shaft 56. The angle, A, of the support rollers 78 is in a direction toward said other of said way members 28. Thus, the driving rollers 54 are skewed at an opposite angle, A, from the support rollers 78 relative to the respective way members 26 and 28. The preferred restraining means for the support rollers 78 comprises a second plurality of support fixtures 80 upraised from and fastened to the way member 28 by a plurality of bolts 81 with a second plurality of inner races 82 of a second plurality of ball bearings 84 supported on pins 85 affixed to the support fixtures 80, each of said second plurality fixtures 80 and said pins 85 being at an angle, A, from said axes intersecting line 79 of said support rollers 78 in a direction toward said way member 28. The support rollers 78 are then mounted to the outer races 86 of the second plurality of ball bearings 84.

As previously discussed, each of the way members 26 and 28 includes a plurality of transverse channels 38 in the top thereof. In the preferred embodiment of the invention the first plurality of support fixtures 58 are detachably attached within the transverse channels 38 on the way member 26 and the second plurality of fixtures 80 are detachably attached within the transverse channels 38 on the way member 28. In the preferred embodiment as illustrated, the bottoms 87 of the transverse channels 38 on the way member 28 are at an angle, −A, from the longitudinal axis thereof and the bottoms 88 of the transverse channels 38 on the other way member 26 are at an angle, A, from the longitudinal axis thereof. In this way, and through use of support fixtures 58 and 80, canting of the outer races 60 and the inner races 82 are assured at the desired angle, A, towards or away from the respective way members 26 and 28.

As is further illustrated, in the preferred embodiment of the invention each of the way members 26 and 28 includes a longitudinally disposed channel 34 and 36 respectively in the top thereof interconnecting said plurality of transverse channels 38 therein. Further, each of the first plurality of fixtures 58 and each of the second plurality of fixtures 80 includes a hole 89 therethrough positionable parallel to and within the respective longitudinally disposed channels 34 and 36 and a pin 90 extending through the hole and into said longitudinally disposed channels 34 and 36. As is further illustrated, in the preferred embodiment of the invention each of the way members 26 and 28 includes means for holding each of the pins 90 in an adjustably fixable position within said longitudinally disposed channels 34 and 36. In the particular embodiment illustrated, said holding means comprises a plurality of screws 91 and 92 which pass transversely through the way members 26 and 28 and enter the channels 34 and 36 adjacent to the pins 90 thereby entrapping and holding the pins 90 therebetween.

It is preferred that the cylindrical surfaces 96 of the driving rollers 54 and the cylindrical surfaces 98 of the support rollers 78 are covered with a resilient material having a hard rubber-like surface. In this way it is ensured that the work piece being advanced by the conveyor is not harmed and further good frictional contact is provided between the surfaces of the driving rollers 54 and the support rollers 78 and the work piece whereby slippage is eliminated.

For proper operation of the conveyor, it is important that the angle, A, be no more than about 10°. More preferably this angle, A, falls within the range from about 1° to about 5°. When the angle, A, is of this order of magnitude, relatively fast rotation of the work pieces can be assured as can their smooth propulsion.

Generally the shaft 56 is driven in a very simple manner as by a motor 100 mounted to the frame 14 by a bracket 101 drivingly attached to the shaft 56 by, for example, a belt 102 acting at the circumference of a wheel 104 which is attached radially about the shaft 56. It is preferred that the motor 100 be of variable speed whereby the speed of propulsion of work pieces by the conveyor is determined by the speed of the motor and by the skew angle, A.

While not meaning to be bound in any way by theory, it is to be pointed out that theoretically actual translation of a work piece through a revolution of a driving roller 54, is determined by the relationship $Ta = C \sin A$ where $Ta$ represents axial translation, $C$ is the circumference of the driving roller 54 and of the support roller 78 and $A$ is the skew angle as defined above. For example, with 2.5 inches (63.5 mm) diameter driving rollers 54 and support rollers 78 mounted at a skew angle of 3° approximately 0.41 inches (10.4 mm) of axial translation is imparted to the work piece per revolution of the driving roller 54. If the driving roller 54 is driven at 50 rpm, the work piece is translated axially at a rate of approximately 20 inches (508 mm) per minute. The rate of non-slip axial translation is independent of the diameter of the cylindrical work piece. The above theory of course assumes that the support rollers 78 are mounted at the same skew angle, i.e. the same numerical angle as the driving rollers 54 but taken in an opposite direction relative to the respective way member 28, and are permitted to rotate freely as previously described in detail.

While the invention has been described in connection with specific embodiments thereof, it will be understood that it is capable of further modification, and this application is intended to cover any variations, uses or adaptations of the invention following, in general, the principles of the invention and including such departures from the present disclosure as come within known or customary practice in the art to which the invention pertains and as may be applied to the essential features hereinbefore set forth, and as fall within the scope of the invention and the limits of the appended claims.

That which is claimed is:

1. A conveyor for transporting cylindrical work pieces along a longitudinal axis thereof at a controlled speed, comprising:
   a longitudinally extending frame;
   a pair of longitudinal way members mounted above said frame with their longitudinal axis in generally parallel relation to one another and to the longitudinal axis of said frame;
   a single shaft located generally above and with its axis generally parallel to the longitudinal axis of a respective one of said way members;
   a plurality of cylindrical surfaced driving rollers having said shaft passing therethrough in driving relation thereto;
   a first plurality of support fixtures upraised from said respective one of said way members with a first plurality of outer races of a first plurality of bearings supported one atop each of said first plurality of fixtures at an angle, A, from the axis of said shaft, said driving rollers being mounted to a first plurality of inner races of said first plurality of bearings, in a direction away from said respective one of said way members;
   a plurality of cylindrical surfaced non-driven support rollers in one to one relation with and spaced apart from said driving rollers rotatingly supported generally above a respective other of said way members;
   a second plurality of support fixtures upraised from said respective other of said way members with a second plurality of inner races of a second plurality of bearings supported by each of said second plurality of fixtures at an angle, A, from a line intersecting the axis of each of said support rollers and parallel to the axis of said shaft in a direction toward said respective other of said way members, said support rollers being mounted to a second plurality of outer races of said second plurality of bearings;
   means for adjustably moving said first plurality of bearings relative to said respective one of said way members and adjacent thereto;
   means for adjustably moving said second plurality of bearings relative to said respective other of said way members and adjacent thereto; and
   a motor drivingly coupled to said shaft.

2. A conveyor as in claim 1, wherein said driving rollers include a generally conical cavity generally longitudinally therein and generally coaxial with the cylindrical surfaces thereof through which said shaft passes, the angle of said conical cavity being greater than 2A.

3. A conveyor as in claim 2, including a plurality of couplings secured to said shaft adjacent the smaller ends of said conical openings of said driving rollers and drivingly coupled to said driving rollers to rotate them.

4. A conveyor for transporting cylindrical work pieces along a longitudinal axis thereof at a controlled speed, comprising:
   a longitudinally extending frame;
   a pair of longitudinal way members mounted above said frame with a longitudinal axis in generally parallel relation to one another and to the longitudinal axis of said frame, each of said way member including a plurality of transverse channels in the top thereof;
   a single shaft located generally above and with its axis generally parallel to the longitudinal axis of one of said way members;
   a plurality of cylindrical surfaced driving rollers each including a generally conical cavity generally longitudinally therein and generally coaxial with the cylindrical surfaces thereof through which said shaft drivingly passes, the angle of said conical cavity being greater than 2A;
   a first plurality of support fixtures upraised from said one of said way members and detachably attached within the transverse channels thereon with a first plurality of outer races of a first plurality of bearings supported one atop each of said first plurality of fixtures at an angle, A, from the axis of said shaft, said driving rollers being mounted to a first plurality of inner races of said first plurality of bearings in a direction away from said one of said way members;
   a plurality of cylindrical surfaced non-driven support rollers in one to one relation with and spaced apart from said driving rollers rotatingly supported generally above the other of said way members;
   a second plurality of support fixtures upraised from said other of said way members and detachably attached within the transverse channels thereon with a second plurality of inner races of a second plurality of bearings supported by each of said second plurality of fixtures to rotate about an axis of rotation at an angle, A, from a line intersecting the axis of each of said support rollers and parallel to the axis of said shaft in a direction towards said other of said way members, said support rollers being mounted to a second plurality of outer races of said second plurality of bearings;
   a plurality of couplings secured to said shaft adjacent the smaller ends of said conical openings of said driving rollers and drivingly coupled to said driving rollers to rotate them; and
   a motor drivingly coupled to said shaft.

5. A conveyor as in claim 4, wherein the bottoms of said transverse channels on said one way member are at an angle, A, from the longitudinal axis thereof and the bottoms of said transverse channels on said other way member are at an angle, −A, from the longitudinal axis thereof.

6. A conveyor as in claim 5, wherein each of said way members includes a longitudinally disposed channel in the top thereof interconnecting said plurality of transverse channels therein, each of said first plurality of fixtures and each of said second plurality of fixtures includes a hole therethrough parallel to and within said longitudinally disposed channels and a pin extending through said hole and into said longitudinal channels, and each of said way members includes means for holding each of said pins in an adjustably fixable position within said longitudinally disposed channel.

7. A conveyor as in claim 6, including means for adjusting the mounting of each of said way members relative to said frame and thereby coordinatively adjusting the separation of each of said plurality of driving rollers from the corresponding one of said plurality of support rollers.

8. A conveyor as in claim 7, wherein said adjusting means comprise four set screws, one set screw adjacent each end of each of said way members, said set screws being attached to four brackets on said frame, one bracket being adjacent each end of each of said way members.

9. A conveyor as in claim 8, including means for bolting said pair of way members into the top of said frame.

10. A conveyor as in claim 9, wherein the top of said frame is in the shape of an inverted V including two generally equal size legs joined at an apex and said way members are mounted one upon each leg of said V with their longitudinal axes generally parallel to said apex.

11. A conveyor as in claim 10, wherein said angle, A, is no more than about 10°.

12. A conveyor as in claim 11, wherein said angle, A, falls within the range from about 1° to about 5°.

13. A conveyor as in claim 12, wherein the cylindrical surfaces of said driving rollers and the cylindrical surfaces of said support rollers are covered with a resilient material.

* * * * *